United States Patent
Hoglund et al.

(10) Patent No.: US 11,272,460 B2
(45) Date of Patent: Mar. 8, 2022

(54) COMMUNICATION DEVICE AND METHOD FOR INDICATING A PREFERENCE BASED ON THE DEVICE POWER CONSUMPTION OR ON PERFORMANCE OF CARRIERS

(71) Applicant: Telefonaktiebolaget LM Ericsson (publ), Stockholm (SE)

(72) Inventors: Andreas Hoglund, Solna (SE); Ali Nader, Malmo (SE); Bela Rathonyi, Lomma (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 181 days.

(21) Appl. No.: 16/619,319

(22) PCT Filed: Jun. 8, 2017

(86) PCT No.: PCT/EP2017/063961
§ 371 (c)(1),
(2) Date: Dec. 4, 2019

(87) PCT Pub. No.: WO2018/224148
PCT Pub. Date: Dec. 13, 2018

(65) Prior Publication Data
US 2020/0100190 A1     Mar. 26, 2020

(51) Int. Cl.
*H04W 72/04* (2009.01)
*H04W 72/08* (2009.01)
(Continued)

(52) U.S. Cl.
CPC ....... *H04W 52/243* (2013.01); *H04W 72/042* (2013.01); *H04W 72/048* (2013.01);
(Continued)

(58) Field of Classification Search
CPC ............ H04W 52/243; H04W 72/042; H04W 72/048; H04W 72/0486; H04W 72/08; H04W 74/0833
See application file for complete search history.

(56) References Cited

U.S. PATENT DOCUMENTS

2018/0103398 A1* 4/2018 Jung .................. H04W 76/19
2021/0127397 A1* 4/2021 He .................... H04W 74/0833

FOREIGN PATENT DOCUMENTS

WO    2012021098 A1    2/2012
WO    2014184602 A1    11/2014

OTHER PUBLICATIONS

PCT International Search Report, dated Feb. 13, 2018, in connection with International Application No. PCT/EP2017/063961, all pages.
(Continued)

*Primary Examiner* — Melvin C Marcelo
(74) *Attorney, Agent, or Firm* — Leffler Intellectual Property Law, PLLC (57) ABSTRACT

A wireless communication device and method therein for improving its performance are disclosed. The wireless communication device obtains information on power consumption requirement and/or performance of certain carriers regarding at least one of path loss, load and interference. The wireless communication device determines an indication parameter associated with preferences of the wireless communication device based on the obtained information. The wireless communication device then sends the indication parameter to the network node and receives signals from the network node with allocated radio resources configured by the network node based on the indication parameter.

24 Claims, 4 Drawing Sheets

(51) Int. Cl.
*H04W 52/02* (2009.01)
*H04W 52/24* (2009.01)
*H04W 74/08* (2009.01)

(52) U.S. Cl.
CPC ....... *H04W 72/0486* (2013.01); *H04W 72/08* (2013.01); *H04W 74/0833* (2013.01)

(56) References Cited

OTHER PUBLICATIONS

PCT Written Opinion, dated Feb. 13, 2018, in connection with International Application No. PCT/EP2017/063961, all pages.
3GPP TSG-RAN WG2 #97, R2-1702318, Athens, Greece, Feb. 13-17, 2017, Apple et al., "Signaling support for CE mode and bandwidth switch for FeMTC devices", 3 pages.

* cited by examiner

COMMUNICATION DEVICE AND METHOD FOR INDICATING A PREFERENCE BASED ON THE DEVICE POWER CONSUMPTION OR ON PERFORMANCE OF CARRIERS

TECHNICAL FIELD

Embodiments herein relate to communication devices and method therein for improving performance. In particular, they relate to improve performance for machine-to-machine (M2M) communication or Internet of Things (IoT) devices in a wireless communication network.

BACKGROUND

Wireless communication networks, such as Global System for Mobile Communications (GSM), Universal Mobile Telecommunications System (UMTS), Wideband Code Division Multiple Access (WCDMA) or High Speed Packet Access (HSPA), 3G Long Term Evolution (LTE), usually cover a geographical area which is divided into cell areas. Each cell area is served by a base station, which may also be referred to as a network node (NW), eNodeB (eNB), an access node, an access point etc.

A wireless communication network may include a number of cells that can support communications for a number of wireless communication devices, such as user equipment (UE). Each cell or NW node may use certain carrier frequencies and cover certain system bandwidth. The NW node servers a wireless communication device via a communication link, which may be referred to as a serving node, cell, beam, sector etc.

In the 3rd Generation Partnership Project (3GPP), three different radio access technologies have been standardized for the purpose of Machine Type Communication (MTC) or Machine-to-Machine (M2M): LTE MTC (eMTC or Cat-M1), Narrowband Internet-of-Things (NB-IoT), and Enhanced Coverage GSM (EC-GSM). One important aspect for MTC is to minimize control signalling overhead for relatively small amount data transmissions. In order to reduce the signalling for Radio Resource Control (RRC) Connection Setup, two solutions were introduced in LTE standard Rel-13: data over non-access stratum (DoNAS) with Cyclic prefix (CP) optimization and RRC Suspend/Resume User Plane (UP) optimization. In the DoNAS solution, data is sent over NAS and the Access Stratum (AS) functionality is reduced to a large extent. As a consequence, a lot of UE capabilities, which e.g. in the LTE standard Rel-8 procedure would be made known to the eNB from the UE context stored in the Mobility Management Entity (MME) during the RRC Connection setup and applied in the RRC re-configuration step, must in the case of DoNAS be signalled in RRC Connection Request message, i.e. in step 3 (Msg3) of the random access procedure. In the RRC Suspend/Resume solution a previous RRC Connection is resumed upon the transmission of a Resume-ID in Msg3, i.e. RRC Resume Request, and this case is more similar to the Rel-8 RRC Connection Setup procedure. The DoNAS solution is mandatory for NB-IoT UEs whereas it is optional for the LTE UEs (Cat-0, Cat-M1, Cat-1, etc.) The RRC Suspend/Resume solution is optional for all UEs.

eMTC has been standardized in 3GPP Rel-13 to support coverage enhancements (CE) of up to 15 dB. This is achieved by time repetition in a Transmission Time Interval (TTI) bundling manner, similar to that introduced for Voice over Internet Protocol (VoIP) in Rel-8. In Rel-8, TTI bundling is limited to the uplink shared data channel and fixed to 4 repetitions. For Rel-13 MTC UEs requiring coverage enhancements, the number of repetitions is up to several hundreds and can be configured per cell or per UE, and will also be applied to the downlink. For random access (RA) it has been agreed to have 4 different CE-levels, i.e. 4 different Physical Random Access Channel (PRACH) configurations with different repetition levels. For dedicated transmissions in RRC Connected mode it has been agreed that the repetition level will be up to the network (NW). Further it has been agreed that UE should not report any change in their CE level since this would generate a lot of unnecessary signalling.

In Rel-12, a lower complexity (LC) UE category (Cat-0) was introduced to support lower manufacturing costs for MTC devices. In Rel-13 further complexity reductions are being introduced where the largest change is a reduced device bandwidth to 6 Physical resource blocks (PRBs) or 1.4 MHz. This means that some legacy channels like the physical downlink control channel, PDCCH, which spans over the entire system bandwidth, cannot be received. The working assumption for these low complexity UEs is to replace PDCCH with an updated version of enhanced PDCCH (EPDCCH) transmitted only within 6 PRBs, referred to as MTC physical downlink control channel (M-PDCCH). The lower complexity of the devices means that a small number of repetitions might be needed also for these devices in normal coverage. That is, to counteract the losses from using only one receiving antenna (Rel-12), loss of frequency diversity (Rel-13), etc. Further, due to the extended transmission time from repetition, the working assumption is to have cross-subframe scheduling. That is, a transmission is first scheduled by repetitions on E-PDCCH and then the repetitions of the actual data transmission are carried out after the final transmission of the E-PDCCH.

NB-IoT is a narrowband system developed for cellular internet of things by 3GPP also in Rel-13. The system is based on existing LTE systems and addresses optimized network architecture and improved indoor coverage for massive number of devices having the following characteristics:
- low throughput devices e.g. 2 kbps
- low delay sensitivity, e.g. about 10 seconds
- ultra-low device cost, e.g. below 5 dollars
- low device power consumption, e.g. battery life of 10 years It is envisioned that a large cell covering about 1 $km^2$ in this system will serve thousands, e.g. 50 thousand, devices such as sensors, meters, actuators, and alike. In order to be able to make use of existing spectrum, e.g. GSM, a fairly narrow bandwidth has been adopted for NB-IoT technology. The entire NB-IoT is contained within 200 kHz or one PRB, i.e. 12 subcarriers of 15 kHz each. In NB-IoT this is referred to as one carrier or one PRB.

For Frequency Division Duplex (FDD) mode of NB-IoT, i.e. when the transmitter and the receiver operate at different carrier frequencies, only half-duplex mode needs to be supported in the UE. In order to achieve improved coverage, data repetition is used both in uplink (UL) and/or downlink (DL). The lower complexity of the devices, e.g. having only one transmission/receiver chain, means that some repetition might be needed also in normal coverage. Further, to alleviate UE complexity, the working assumption is to have cross-subframe scheduling. That is, a transmission is first scheduled on a Narrowband Physical DL Control Channel (NPDCCH) and then the first transmission of the actual data on the Narrowband Physical DL Shared Channel (NPDSCH) is carried out after the final transmission of the NPDCCH. Similarly, for UL data transmission, information about resources scheduled by the NW and needed by the UE for UL transmission is first conveyed on the NPDCCH and then the first transmission of the actual data by the UE on the NPUSCH is carried out after the final transmission of the NPDCCH. In other words, for both cases above, there is no simultaneous reception of control channel and reception/transmission of data channel from the UE's perspective.

Up to now, cellular networks in 3GPP are largely network controlled, that is decisions on how to use radio resources are taken by the eNB. However, for various reasons the choices made by the eNB may in some cases not be optimal for the UE, especially for the case of NB-IoT where the eNB has a limited knowledge of the UE and its conditions, which may result in degraded performance for the UE.

SUMMARY

It is an object of embodiments herein to provide a method and apparatus to improve performance of a wireless communication device in a wireless communication network.

According to a first aspect of embodiments herein, the object is achieved by a method performed in a wireless communication device for improving performance. The wireless communication device operates in a wireless communication network and served by a network node. The wireless communication device obtains information on power consumption requirement and/or performance of certain carriers regarding at least one of path loss, load and interference. The wireless communication device determines an indication parameter associated with preferences of the wireless communication device based on the obtained information. The wireless communication device sends the indication parameter to the network node. The wireless communication device receives signals from the network node with allocated radio resources configured by the network node based on the indication parameter.

According to a second aspect of embodiments herein, the object is achieved by a wireless communication device in a wireless communication device for improving performance. The wireless communication device operates in a wireless communication network and served by a network node. The wireless communication device is configured to obtain information on power consumption requirement and/or performance of certain carriers regarding at least one of path loss, load and interference. The wireless communication device is further configured to determine an indication parameter associated with preferences of the wireless communication device based on the obtained information. The wireless communication device is configured to send the indication parameter to the network node. The wireless communication device is further configured to receive signals from the network node with allocated radio resources configured by the network node based on the indication parameter.

According to the embodiments herein, the wireless communication device uses knowledge, such as power consumption requirement, performance of certain carriers, e.g. downlink interference levels, preferences regarding traffic type etc., which the network node does not have to influence configuration of allocation of radio resources for its own benefit. This may be done by sending an indication parameter associated with preferences of the wireless communication device to the network node. The network node then may configure radio resources for the wireless communication device based on the indication parameter. In this way, the wireless communication device may receive signals from the network node with allocated radio resources better suited for the wireless communication device which will improve its performance. This has advantage especially for the case of NB-IoT UEs where the network node has reduced knowledge of the UE conditions, e.g. no UE measurement reports, more limited CQI transmissions, reduced support for Scheduling Request etc. Further, the increased possibilities to influence the network node decision by manipulating many UE capability indications added to Msg3 due to DoNAS being mandatory make the embodiments herein easy to be implemented. There are lots of cases where both the UE has an interest of obtaining a different treatment to improve performance, and where there is a UE capability or signaling from the UE which may be manipulated for this purpose.

Therefore the embodiments herein provide a method and apparatus for improving performance of a wireless communication device in a wireless communication network.

BRIEF DESCRIPTION OF THE DRAWINGS

Examples of embodiments herein are described in more detail with reference to attached drawings in which.

DETAILED DESCRIPTION

As part of developing embodiments herein, the NB-IoT operation will first be described.

In NB-IoT, downlink (DL) transmission is based on Orthogonal Frequency-Division Multiplexing (OFDM) with 15 kHz subcarrier spacing and has same symbol and cyclic prefix durations as for legacy LTE for all the above operation scenarios. For uplink (UL) transmission, both multi-tone transmissions based on Single-Carrier Frequency-Division Multiple Access (SC-FDMA), and single tone transmission are supported. This means that the physical waveforms for NB-IoT in downlink and also partly in uplink are similar to legacy LTE.

In the downlink, NB-IoT supports both master information broadcast and system information broadcast. System information is provided via a Master Information Block (MIB-NB) that is transmitted on Narrowband Physical Broadcast Channel (NPBCH) and System Information Block (SIB-NB) that is transmitted on Narrowband Physical Downlink Shared Channel (NPDSCH). NB-IoT supports both narrowband physical downlink control channel (NPDCCH) and NPDSCH. The operation mode of the NB-IOT must be indicated to the device, and that is indicated by means of MIB-NB. Two new downlink synchronization signals have been introduced, referred to as the Narrowband Primary Synchronization Signal (NPSS) and the Narrowband Secondary Synchronization Signal (NSSS), with a single instance of NPSS and 504 instances of NSSS. The repetition rate of NPSS is every 10 ms and NSSS 20 ms over 80 ms. The downlink subcarrier spacing is 15 kHz and the NB-IoT downlink system bandwidth is expected to be 200 kHz, with efficient bandwidth of 180 kHz. This is equivalent to a physical resource block in a conventional LTE cell.

The uplink channels are Narrowband Physical Random Access Channel (NPRACH) and Narrowband Physical Uplink Shared Channel (NPUSCH). Notably there is no physical uplink control channel. Additionally, Uplink Demodulation Reference Signals (DMRS) are specified. Two different subcarrier spacings are possible: 15 kHz and 3.75 kHz. The first one is the same as for other LTE standards and leads to a total of 12 subcarriers while the second one leads to a total of 48 subcarriers. Single tone transmissions can use both subcarrier spacings while SC-FDMA transmissions can only use the 15 kHZ subcarrier spacing.

Figure 1:
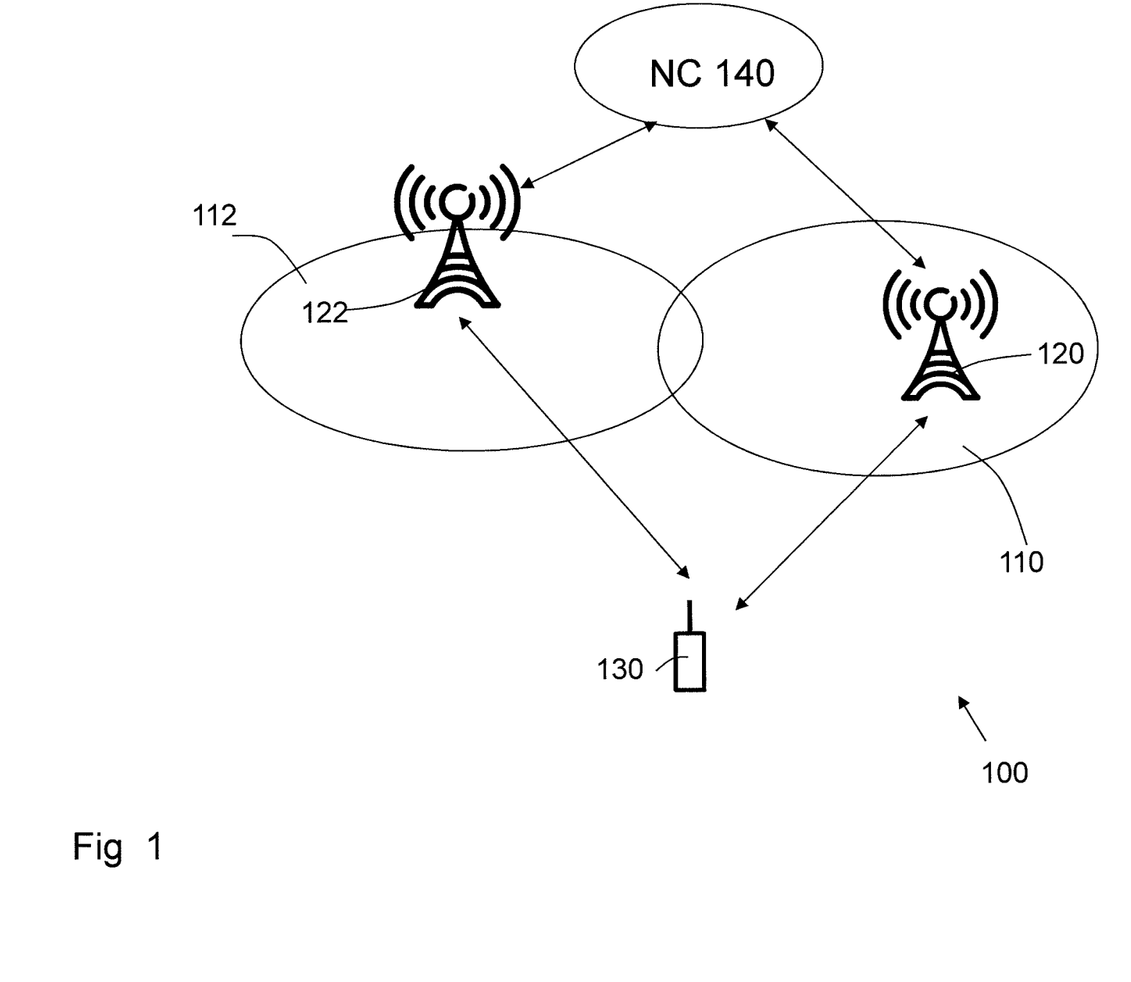
FIG. 1 is a schematic block diagram illustrating a wireless communication network in which embodiments herein may be implemented.

FIG. 1 depicts an example of a wireless communication network 100 in which embodiments herein may be implemented. The wireless communication network 100 may be any wireless system or cellular network, such as GSM network, a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi), a Fourth Generation (4G) network, a Fifth Generation (5G) cellular network etc.

The wireless communication network 100 comprises a plurality of cells including a first cell 110 comprising a first Access Node (AN) 120 and a second cell 112 comprising a second Access Node 122, as depicted in FIG. 1. The first Access Node 120 serves the first cell 110, while the second Access Node 122 serves the second cell 112. The first Access Node 120, the second Access Node 122 are network access nodes each being, for example, an eNB, gNB, eNodeB, gNodeB or a Home Node-B, Home eNode-B, Home gNode-B, or an access point.

For the sake of easier understanding, the term "cell" has been used above. However, spatial division between operation areas of a network node may be based on other coverage entities, such as sectors, beams, etc. Sectors are statically defined directions from an antenna of the network node and beams are dynamically defined directions from an antenna of the network node. Thus, for any disclosure herein where the term "cell" is used, the demonstrated principles are equally feasible for sectors, beams, etc., unless explicitly or implicitly expressed otherwise.

The wireless communication network 100 may further comprise a Network Controller 140 which communicates with the first and second access nodes 120, 122, and acts as a handling unit or a controller for different Radio Access Technologies. The Network Controller 140 may be a separate node as depicted in the figure, or its corresponding functionalities may be incorporated within another network node such as e.g. the Access nodes 120, 122.

A plurality of wireless communication devices operate in the wireless communication network 100, whereof a wireless communication device 130 is depicted. The wireless communication device 130 may be any IoT device, such as a user equipment, a mobile wireless terminal or a wireless terminal, a mobile phone, a sensor or actuator, a drone with wireless capabilities or any other radio network units capable to communicate over a radio link in a wireless communication network. As shown in FIG. 1, the wireless communication device 130 may communicate with the first and second Access Nodes 120, 122, and the NW node 120 servers or has served the wireless communication device 130 via a communication link, which may be referred to as a serving node, cell, beam, sector etc.

Figure 2:
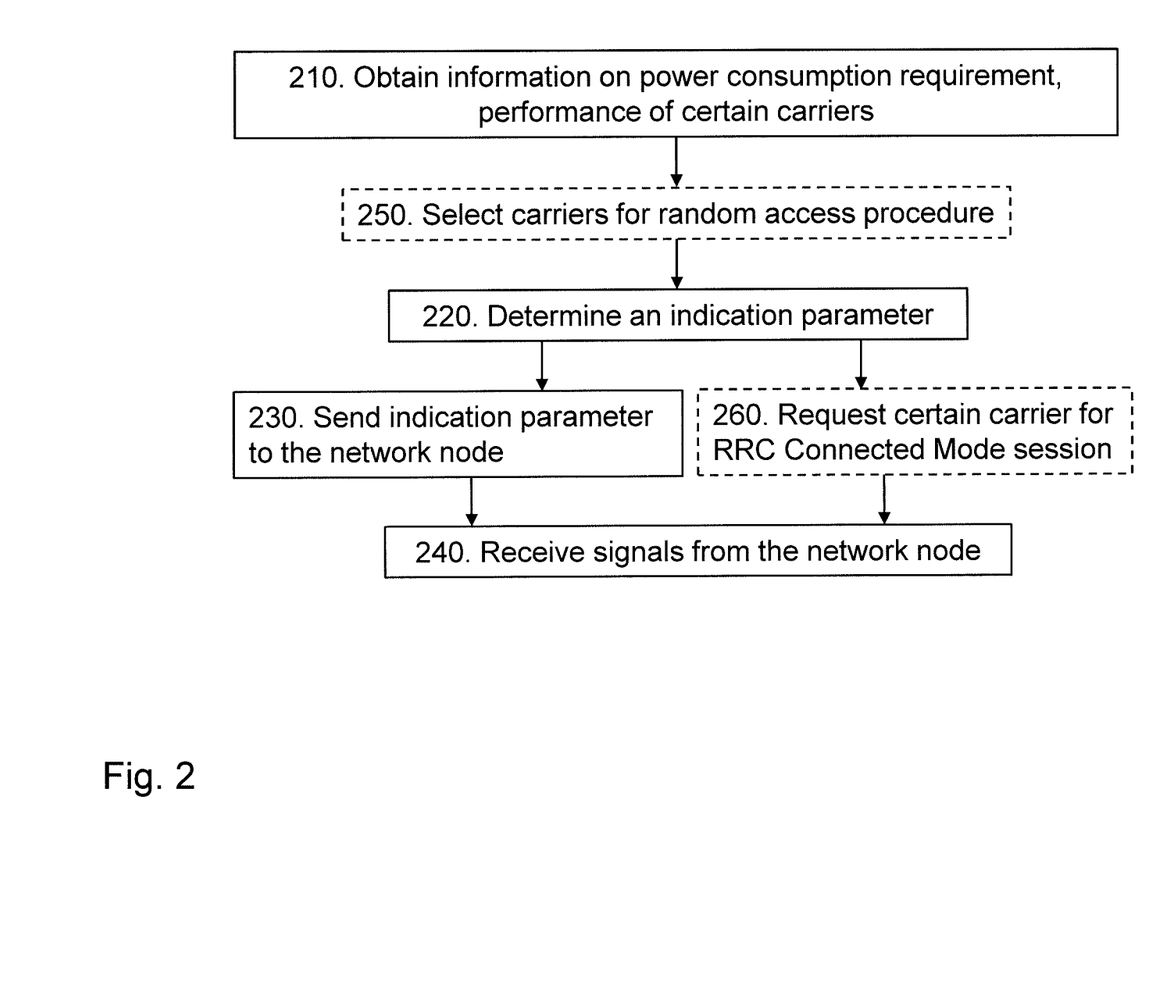
FIG. 2 is a flowchart depicting one embodiment of a method performed in a wireless communication device.

FIG. 2 shows a flow chart of a method with actions that may be performed in a wireless communication device 130 for improving its performance in the wireless communication networks 100 according to the embodiments herein. It is assumed that the wireless communication device 130 is operating in the wireless communication networks 100 and is served by a NW node, e.g. the first Access Node 120. In the following, the term "UE" and "wireless communication device" are used interchangeably. The flow chart illustrates the following actions, which actions may be taken in any suitable order:

Action 210

In order to influence the configuration of the network node on allocating radio resources for its own benefit, the wireless communication device 130 will use knowledge which the network node does not have. Therefore the wireless communication device 130 obtains information on, e.g. power consumption requirement, performance of certain carriers regarding at least one of path loss, load and interferences etc.

According to some embodiments herein, the wireless communication device 130 may obtain information on performance of certain carriers by obtaining the information from previous radio access (RA) attempts and transmissions in RRC Connected mode. For example, MTC devices will often be stationary and based on previous RA attempts and transmissions in RRC Connected mode, the wireless communication device 130 may build up knowledge of which carriers are good or bad for its performance. Even if the network node could theoretically also acquire such knowledge, it would at this point not know which UE is about to perform RA due to the UE context is removed when the UE is released to idle mode.

The random access procedure in LTE typically includes four steps with 4 messages Msg1-Msg4 communicated between a network node and a wireless communication device. Since in the NPRACH configuration, a downlink carrier is also configured for Msg2 and Msg4, UE measurements for the downlink carrier quality may also be a possible input for the performance of certain carriers. Therefore, according to some embodiments herein, the wireless communication device 130 may obtain information on performance of certain carriers based on current measurements on downlink carrier quality.

Action 220

After the wireless communication device 130 has gained the information on, e.g. power consumption requirement, performance of certain carriers regarding at least one of path loss, load and interferences etc., the wireless communication device 130 determines an indication parameter associated with preferences of the wireless communication device based on the obtained information.

According to some embodiments herein, the indication parameter associated with preferences of the wireless communication device may include at least one of the following:
  an indication parameter indicating preferred carriers for RRC connected mode session;
  a capability indication parameter indicating preferred power class;
  a capability indication parameter indicating preferred transmission tone type;
  a capability indication parameter indicating preferred coverage enhanced mode;
  a capability indication parameter indicating preferred operating bandwidth.

For example, in NB-IoT, there is also a capability indication for Multi-tone (MT) transmission in Msg3. That is NPUSCH may either be transmitted with Single-tone (ST), e.g. 3.75 kHz or 15 kHz or Multi-tone e.g. 3×15 kHz, 6×15 kHz or 12×15 kHZ. If a UE is MT capable, it is typically beneficial to transmit with MT due to shorter latency and longer battery life. The network node may need to know this capability to be able to schedule the UE accordingly. However, in some cases it may be beneficial for a MT capable UE to still transmit ST. Reasons may for example be that load or interferences is higher on the MT resources, e.g. during certain hours known to the UE or simply that the network node configuration prioritizes ST and more radio resources are configured for that. In this case a MT capable UE may in Msg3 indicate that it is a ST capable UE to gain an advantage. Note that this is per access attempt and could be changed from time to time by the UE. Note that Multi-tone support is mandatory in LTE standard Release-13 but that an IOT bit (Interoperability testing) is introduced to ease the introduction of the feature and allow for proper testing. Further, NPRACH may be partitioned for ST and MT transmission of Msg3. That is, a UE may, by the selection of NPRACH resource, indicate whether it will transmit Msg3 with MT or ST. Thus this selection may be manipulated by the UE such that a MT capable UE still selects a ST NPRACH resource since it expects, e.g. based on previous attempts or monitoring of all RA, or simply the number of NPRACH resources assigned for ST and MT, that the load on ST NPRACH is to be lower than on the MT NPRACH. Hence there will be a lower collision risk. A partitioning in MT NPRACH may not always be configured, e.g. for higher repetition levels, and that is why there is also an MT indication in Msg3 such that the network node can schedule the UE with MT NPUSCH if possible.

Therefore, according to some embodiments herein, when the load and/or interferences is high on multi-tone carriers, the indication parameter may be determined to be a capability indication parameter indicating single-tone instead of supported multi-tone for the wireless communication device 130.

For another example, in NB-IoT Rel-14, a new UE output power class is being introduced which is lower than the existing 23 dBm and 20 dBm classes. This is not yet agreed in 3GPP but most likely it will be of 14 dBm output power. In legacy Rel-8 RRC Connection Setup, the UE capabilities which are stored in the MME are made known to the network node at first after Msg5. This means that until this point the network node does not know if the access is from a UE with 14 dBm power class or from a UE with 23 dBm power class but with 9 dB worse path loss. The network node may therefore have to assume the latter case and use more repetitions in the downlink to make sure it reaches the UE in both cases. In case the UE is a 23 dBm power class UE, this is a great waste of resources. It is discussed in 3GPP how the UE should give an early indication that it is a 14 dBm power class UE. It is likely that an indication for this will be added in Msg3.

Therefore, if a higher power class UE, e.g. 23 dBm or 20 dBm power class, suspects that Msg4 will fail or need re-transmission, it may use this message Msg3 and indicate that it is a 14 dBm power class UE to obtain additional downlink repetitions from the network node. For Rel-15, it is proposed to introduce a similar lower UE power class also for eMTC and the above may then also be applicable for this case.

Therefore, according to some embodiments herein, when the path loss and/or interference is high on carriers, the indication parameter may be determined to be a capability indication parameter indicating a lower power class than supported power class for the wireless communication device 130.

For a third example, in Rel-13 eMTC, Coverage Enhancements (CE) are divided in to CE mode A for moderate coverage enhancements for largely compensating the lesser capabilities of Cat-M1 with one receive antenna etc., and CE mode B for larger numbers of repetitions supporting up to 155.6 dB Minimum Coupling Loss (MCL). For Cat-M1, CE mode A is a mandatory capability whereas CE mode B is optional. If a CE mode B capable Cat-M1 UE must achieve very long battery life of several years, CE mode B operation may be devastating and it may be in the interest of the UE to prioritize battery life at the expense of coverage. This may then be achieved by signaling to the network node that the UE does not support CE mode B when it in fact does.

Therefore, according to some embodiments herein, when the power consumption requirement is high or strict for the wireless communication device 130, the indication parameter may be determined to be a capability indication parameter indicating a lower coverage enhanced mode than supported coverage enhanced mode for the wireless communication device 130.

For a fourth example, in Rel-15 it has been suggested that higher complexity category UEs may emulate an operation of low complexity UE categories such as Cat-M1 and Cat-M2 to obtain longer battery life. That is a higher complexity UE may operate in a narrower bandwidth of e.g. 1.4 MHz or 5 MHz to extend its battery life. This is possible in CE mode A and B in Rel-13 but only for coverage enhancements, not for battery life extension in normal coverage. It is not obvious that it is always better for the network to allow high complexity UEs to operate in a narrower bandwidth than what they are capable of. So if this mode of operation is denied by the network node, or not introduced at all in Rel-15 or any future release, the high complexity UE may incorrectly indicate that it is e.g. a Cat-M2 UE to extent its battery life.

Therefore, according to some embodiments herein, when the power consumption requirement is high or strict, the indication parameter may be determined to be a capability indication parameter indicating a narrower operating bandwidth than supported operating bandwidth.

Action 230

In order to influence the configuration of the network node on allocating radio resources for its own benefit, the wireless communication device 130 sends the indication parameter to the network node. The network node may then configure radio resources for the wireless communication device 130 based on the indication parameter. As discussed above, the indication parameter may indicate preferences of the wireless communication device 130 for different situations regarding to, e.g. power class, ST or MT-tone transmission, coverage enhanced mode, operating bandwidth etc. Therefore, the radio resources configuration based on the indication parameter may be better suited for the wireless communication device 130.

According to some embodiments herein, the wireless communication device 130 may send the indication parameter to the network node in a RRC connection request.

According to some embodiments herein, the wireless communication device 130 may send the indication parameter to the network node by a separate signaling.

Action 240

The wireless communication device 130 receives signals from the network node with allocated radio resources configured by the network node based on the indication parameter. In this way, the wireless communication device may receive signals from the network node with allocated radio resources better suited for the wireless communication device which will improve its performance.

According to some embodiments herein, the method may further comprise the following actions:

Action 250

The wireless communication device 130 may select carriers for random access procedure based on the indication parameter.

For multi-PRB operation it is agreed in 3GPP Rel-14 that upon Random Access (RA), the UE shall randomly select amongst the NPRACH resources configured for its Coverage Enhancement level (CE-level). That is, if the UE, based on Reference Signal Received Power (RSRP) measurement, estimates its CE-level and finds that NPRACH with this CE-level is configured on e.g. the uplink anchor carrier and three non-anchor carriers, it will select one of these carriers randomly. However, if the UE knows that its performance is worse on certain carriers, it may apply a biased selection to gain advantage and have a larger probability of using a good carrier. For example, a UE may be in a constant fading dip in one of the four NPRACH-carriers or in the DL carrier associated with that NPRACH. In this case the repetitions and hence the transmission time and battery life of the UE may greatly be improved if the UE omitted this carrier and only performed random selection for RA over the other three NPRACH-carriers utilizing a possibly power-boosted DL carrier associated with the NPRACH chosen. In some cases, the embodiments herein may be subtler and the UE may apply some weights and bias to the carrier selection for random access.

Action 260

The wireless communication device 130 may request a certain carrier for RRC Connected Mode session based on the indication parameter.

For NB-IoT multi-PRB operation, after the random access procedure which always on the anchor carrier in Rel-13, and on any carrier in Rel-14, the network node may in Msg4, by means of RRC signaling, configure the UE to another carrier for the RRC Connected Mode session. Based on the indication parameter determined by e.g. previous knowledge of which carriers are favorable for the UE, or based on UE measurements for the downlink carrier quality, a preferred carrier for RRC connected mode session may be requested by the UE from the network node. This may have a standard impact and signaling to indicate the UEs preference may have to be added to Msg3. That is, a new Information Element e.g. UE Carrier Request may have to be added in which the UE can specify which uplink and/or downlink carrier it prefers. The network node may then take this request into account when deciding which carrier the UE should be configured to. An example of why it may be in the interest to do this is that certain downlink carriers are power-boosted, which means fewer repetitions needed in Coverage Enhanced operation and hence improved battery life and latency for the UE. Another example is that the load may be significantly higher on certain carriers, e.g. anchor carriers due to control signaling overhead from NPSS/ NSSS, NPBCH, and System Information, and that in Rel-13 all UE must use the anchor carriers for Random Access and Paging.

According to some embodiments herein, the wireless communication device 130 may convey its capability information, i.e. the indication parameter associated with preferences of the wireless communication device, to the network node through initial messages during the connecting phase, i.e. the RA procedure. While already connected, the wireless communication device 130 cannot update its capability information. When the wireless communication device 130 has already connected and been communicating with the network node, it may notice degraded performance or notice that changing its capability information may be fruitful, e.g. to improve performance, to save power etc. Then it may disconnect from the network node and reconnect to it to convey changed capabilities. Therefore the method may further comprise the following actions with reference to FIG. 3:

Action 310

Figure 3:
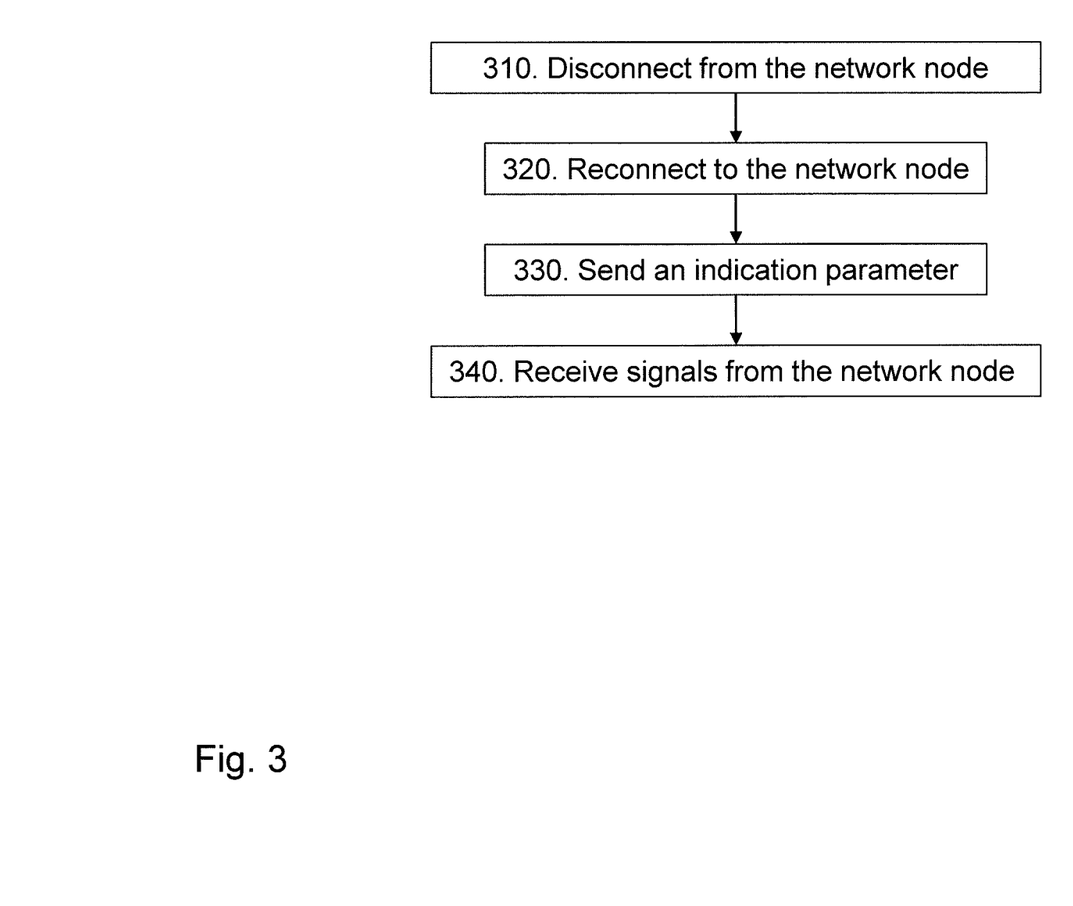
FIG. 3 is a flowchart depicting one embodiment of a method performed in a wireless communication device.

The wireless communication device 130 may disconnect from the network node.

Action 320

The wireless communication device 130 may reconnect to the network node.

Action 330

The wireless communication device 130 may send an indication parameter associated with preferences of the wireless communication device to the network node.

Action 340

The wireless communication device 130 may receive signals from the network node with allocated radio resources configured by the network node based on the indication parameter.

To summarize the above discussions, the wireless communication device 130 uses knowledge, such as power consumption requirement, performance of certain carriers, e.g. downlink interference levels, preferences regarding traffic type etc., which the network node 120 does not have to influence configuration of allocation of radio resources for its own benefit. This may be done by sending an indication parameter associated with preferences of the wireless communication device 130 to the network node 120. The network node 120 then may configure radio resources for the wireless communication device 130 based on the indication parameter. In this way, the wireless communication device 130 receives signals from the network node 120 with allocated radio resources which may be better suited for the wireless communication device 130 so that to improve its performance. The embodiments herein has advantage especially for the case of NB-IoT UEs where the network node 120 has reduced knowledge of the UE conditions, e.g. no UE measurement reports, more limited CQI transmissions, reduced support for Scheduling Request etc. Further, the increased possibilities to influence the network node decision by manipulating many UE capability indications added to Msg3 due to DoNAS being mandatory make the embodiments herein easy to be implemented. There are lots of cases where both the UE has an interest of obtaining a different treatment to improve its performance, and where there is a UE capability or signaling from the UE which may be manipulated for this purpose. Therefore embodiments herein provide a practical and implementable technique for a wireless communication device to improve its performance.

Figure 4:
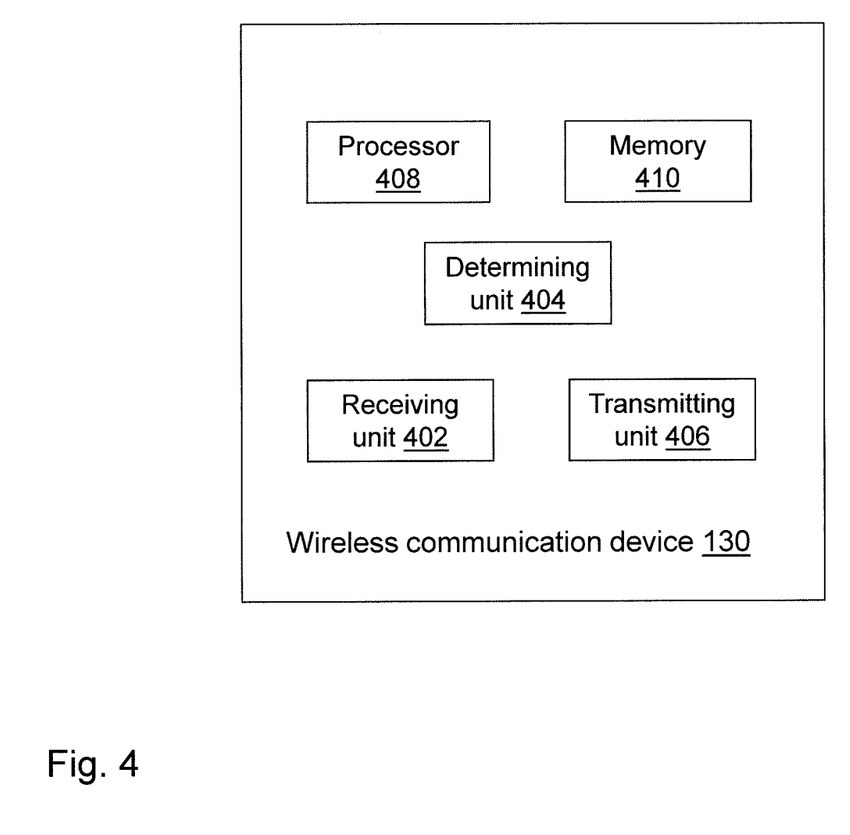
FIG. 4 is a schematic block diagram illustrating embodiments of a wireless communication device.

To perform the method actions in the wireless communication device 130 for improving its performance in the wireless communication network 100 described above in relation to FIG. 2, the wireless communication device 130 comprises circuits or units as depicted in FIG. 4. The wireless communication device 130 comprises e.g. a receiving unit 402, a determining unit 404, a transmitting unit 406, a processor 408 and a memory 410.

The wireless communication device 130 is configured to, e.g. by means of the receiving unit 402 being configured to, obtain information on power consumption requirement and/ or performance of certain carriers regarding at least one of path loss, load and interference.

The wireless communication device 130 is configured to, e.g. by means of the determining unit 404 being configured to, determine an indication parameter associated with preferences of the wireless communication device based on the obtained information.

The wireless communication device 130 is configured to, e.g. by means of the transmitting unit 406 being configured to, send the indication parameter to the network node 120.

The wireless communication device 130 is configured to, e.g. by means of the receiving unit 402 being configured to, receive signals from the network node 120 with allocated radio resources configured by the network node based on the indication parameter.

According to some embodiments herein, the wireless communication device 130 may be configured to, e.g. by means of the determining unit 404 being configured to, select carriers for random access procedure based on the indication parameter.

According to some embodiments herein, the wireless communication device 130 may be configured to, e.g. by means of the transmitting unit 406 being configured to, request a certain carrier for RRC Connected Mode session based on the indication parameter.

According to some embodiments herein, the wireless communication device 130 may be further configured to disconnect from the network node, reconnect to the network node, send an indication parameter described above associated with preferences of the wireless communication device to the network node, and receive signals from the network node with allocated radio resources configured by the network node based on the indication parameter.

Those skilled in the art will appreciate that the receiving unit 402, the determining unit 404 and the transmitting unit 406 described above in the wireless communication device 130 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for the wireless communication device 130 to improve its performance in the wireless communication network 100 may be implemented through one or more processors, such as the processor 408 in the wireless communication device 130, together with computer program code for performing the functions and actions of the embodiments herein. The program code mentioned above may also be provided as a computer program product, for instance in the form of a data carrier carrying computer program code for performing the embodiments herein when being loaded into the wireless communication device 130. One such carrier may be in the form of a CD ROM disc. It is however feasible with other data carriers such as a memory stick. The computer program code may furthermore be provided as pure program code on the cloud and downloaded to the wireless communication device 130.

The memory 410 in the wireless communication device 130 may comprise one or more memory units and may be arranged to be used to store system deployment information, indication parameters, capability information, preferences list, historic lists, data, configurations and applications to perform the methods herein when being executed in the wireless communication device 130.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a wireless communication device for improving performance, wherein the wireless communication device operates in a wireless communication network and is served by a network node, the method comprising:
   obtaining information on power consumption requirement and/or performance of certain carriers regarding at least one of path loss, load and interference;
   determining an indication parameter associated with preferences of the wireless communication device based on the obtained information;
   sending the indication parameter to the network node; and
   receiving signals from the network node with allocated radio resources configured by the network node based on the indication parameter,
   wherein when the load and/or interference is higher on multi-tone carriers than on single-tone carriers, the indication parameter is determined to indicate single-tone transmission instead of supported multi-tone transmission.

2. The method according to claim 1, wherein the indication parameter associated with preferences of the wireless communication device indicates at least one of:
   preferred carriers for Radio Resource Control (RRC) connected mode session;
   a preferred power class;
   a preferred transmission tone type;
   a preferred coverage enhanced mode; and
   a preferred operating bandwidth.

3. The method according to claim 1, further comprising selecting carriers for a random access procedure based on the indication parameter.

4. The method according to claim 1, further comprising requesting a certain carrier for RRC Connected Mode session based on the indication parameter.

5. The method according to claim 1, wherein obtaining information on performance of certain carriers comprises obtaining the information from previous radio access attempts and transmissions in RRC connected mode.

6. The method according to claim 1, wherein the information on performance of certain carriers is obtained from current measurements on downlink carrier quality.

7. The method according to claim 1, wherein when the path loss and/or interference indicates that a message will fail or need retransmission on carriers, the indication parameter is determined to be a capability indication parameter indicating a lower power class than supported power class.

8. The method according to claim 1, wherein when battery life is prioritized over coverage, the indication parameter is determined to indicate a lower coverage enhanced mode than supported coverage enhanced mode.

9. The method according to claim 1, wherein when battery life is to be lengthened, the indication parameter is determined to indicate a narrower operating bandwidth than supported operating bandwidth.

10. The method according to claim 1, wherein the indication parameter is sent to the network node in a RRC connection request.

11. The method according to claim 1, wherein the indication parameter is sent to the network node by a separate signaling from the wireless communication device to the network node.

12. The method according to claim 1, further comprising disconnecting from the network node;
reconnecting to the network node;
sending the indication parameter associated with preferences of the wireless communication device to the network node; and
receiving signals from the network node with allocated radio resources configured by the network node based on the indication parameter.

13. A wireless communication device for improving performance, wherein the wireless communication device operates in a wireless communication network and is served by a network node, the wireless communication device comprising:
a memory; and
processing circuitry coupled to exchange one or more of data and instructions with the memory,
wherein the processing circuitry is configured to cause the wireless communication device to:
obtain information on power consumption requirement and/or performance of certain carriers regarding at least one of path loss, load and interference;
determine an indication parameter associated with preferences of the wireless communication device based on the obtained information;
sending the indication parameter to the network node; and
receive signals from the network node with allocated radio resources configured by the network node based on the indication parameter,
wherein when the load and/or interference is higher on multi-tone carriers than on single-tone carriers, the indication parameter is determined to indicate single-tone transmission instead of supported multi-tone transmission.

14. The wireless communication device according to claim 13, wherein the indication parameter associated with preferences of the wireless communication indicates at least one of:
preferred carriers for Radio Resource Control (RRC) connected mode session;
preferred power class;
preferred transmission tone type;
preferred coverage enhanced mode;
preferred operating bandwidth.

15. The wireless communication device according to claim 13, is further configured to select carriers for random access procedure based on the indication parameter.

16. The wireless communication device according to claim 13, is further configured to request a certain carrier for RRC Connected Mode session based on the indication parameter.

17. The wireless communication device according to claim 13, wherein the wireless communication device is configured to obtain information on performance of certain carriers by being configured to obtain the information from previous radio access attempts and transmissions in RRC connected mode.

18. The wireless communication device according to claim 13, wherein the wireless communication device is configured to obtain information on performance of certain carriers by being configured to obtain the information from current measurements on downlink carrier quality.

19. The wireless communication device according to claim 13, wherein when the path loss and/or interference indicates that a message will fail or need retransmission on carriers, the indication parameter is determined to indicate a lower power class than supported power class.

20. The wireless communication device according to claim 13, wherein when battery life is prioritized over coverage, the indication parameter is determined to indicate a lower coverage enhanced mode than supported coverage enhanced mode.

21. The wireless communication device according to claim 13, wherein when battery life is to be lengthened, the indication parameter is determined to indicate a narrower operating bandwidth than supported operating bandwidth.

22. The wireless communication device according to claim 13, wherein the wireless communication device is configured to send the indication parameter to the network node by being configured to send the indication parameter to the network node in a RRC connection request.

23. The wireless communication device according to claim 13, wherein the wireless communication device is configured to send the indication parameter to the network node by being configured to send the indication parameter to the network node by a separate signaling from the wireless communication device to the network node.

24. The wireless communication device according to claim 13, is further configured to:
disconnect from the network node;
reconnect to the network node;
send the indication parameter associated with preferences of the wireless communication device to the network node; and
receive signals from the network node with allocated radio resources configured by the network node based on the indication parameter.

* * * * *